United States Patent
Busi et al.

(10) Patent No.: US 10,955,986 B2
(45) Date of Patent: Mar. 23, 2021

(54) POPULARITY-BASED PROMOTION OF APPLICATION FEATURES

(71) Applicant: ENTIT SOFTWARE LLC, Sanford, NC (US)

(72) Inventors: Eliraz Busi, Yehud (IL); Itay Ben-Yehuda, Yehud (IL); Daniel Shmaya, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 173 days.

(21) Appl. No.: 16/068,551

(22) PCT Filed: Jan. 11, 2016

(86) PCT No.: PCT/US2016/012863
§ 371 (c)(1),
(2) Date: Jul. 6, 2018

(87) PCT Pub. No.: WO2017/123195
PCT Pub. Date: Jul. 20, 2017

(65) Prior Publication Data
US 2019/0018550 A1    Jan. 17, 2019

(51) Int. Cl.
*G06F 3/0481* (2013.01)
*G06F 11/34* (2006.01)
(Continued)

(52) U.S. Cl.
CPC ........ *G06F 3/0481* (2013.01); *G06F 11/3438* (2013.01); *G06F 16/9535* (2019.01); *G06Q 30/0631* (2013.01)

(58) Field of Classification Search
CPC ............... G06F 3/0481; G06F 11/3438; G06F 16/9535; G06F 16/735; G06F 9/453;
(Continued)

(56) References Cited

U.S. PATENT DOCUMENTS 7,774,349 B2    8/2010  Horvitz
8,055,546 B1   11/2011  Cassone et al.
(Continued)

FOREIGN PATENT DOCUMENTS

WO    WO-2008027923 A2    3/2008

OTHER PUBLICATIONS

International Searching Authority., International Search Report and Written Opinion dated Sep. 30, 2016 for PCT Application No. PCT/US2016/012863 Filed Jan. 11, 2016, 13 pages.
(Continued)

*Primary Examiner* — Kieu D Vu
*Assistant Examiner* — Blaine T. Basom (57) ABSTRACT

According to an example, usage of a plurality of features of an application by users in each of a plurality of tenants may be accessed. Popularities of the plurality of features among the users in each of the plurality of tenants may be determined and a feature of the plurality of features to be promoted to the users in the first tenant may be identified based upon the determined popularities of the features. Additionally, a visual callout to the identified feature may be caused to be displayed to the users in the first tenant to promote the identified feature to the users in the first tenant.

17 Claims, 4 Drawing Sheets

(51) Int. Cl.
  *G06Q 30/06* (2012.01)
  *G06F 16/9535* (2019.01)
(58) Field of Classification Search
  CPC .......... G06Q 30/0254; G06Q 30/0255; G06Q 30/0631; G06Q 30/0282; H04N 21/4668; H04N 21/4826
  See application file for complete search history.

(56) References Cited

U.S. PATENT DOCUMENTS

| | | | |
|---|---|---|---|
| 8,452,797 | B1 | 5/2013 | Paleja |
| 8,626,141 | B2 | 1/2014 | Davies-Moore et al. |
| 8,694,375 | B2 | 4/2014 | Osborne et al. |
| 9,009,291 | B2* | 4/2015 | Westphal ............. G06F 16/954 709/224 |
| 9,058,612 | B2 | 6/2015 | Ben-Itzhak |
| 9,804,730 | B2* | 10/2017 | Lefor .................. G06F 3/0481 |
| 2002/0083165 | A1* | 6/2002 | Nagata .................. G06Q 30/02 709/223 |
| 2006/0228690 | A1 | 10/2006 | Lund |
| 2008/0250323 | A1 | 10/2008 | Huff |
| 2010/0331075 | A1* | 12/2010 | Michelstein .......... G06Q 10/10 463/23 |
| 2011/0125700 | A1* | 5/2011 | Funada ............... G06F 11/3414 706/50 |
| 2013/0132896 | A1 | 5/2013 | Lee |
| 2016/0089606 | A1* | 3/2016 | Javed Lal Mohammed Ameerjan ............... G06F 3/048 463/29 |
| 2018/0203860 | A1* | 7/2018 | Mowatt ............... G06F 16/2455 |

OTHER PUBLICATIONS

Osaki, T., Utilization of Intellectual Property Rights in New Business Environment, 2010, IIP Bulletin 2010, 10 pages.

* cited by examiner

POPULARITY-BASED PROMOTION OF APPLICATION FEATURES

BACKGROUND

Applications may include a number of features that are available for users to access and implement. Users, however, may not use many of the features because the users are often unaware of the features or how to use the features, or are accustomed to a particular way of implementing the applications. As such, many users overlook features that may result in greater productivity and/or enjoyment from using the applications.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are apparatuses and methods for promoting a feature of an application. Particularly, a feature may be promoted to the users in a tenant of a plurality of tenants based upon the popularity of the feature among those users. That is, according to an example, a feature that is unpopular among the users in a first tenant but that is popular among the users in the other tenants may be promoted to the users in the first tenant. In other examples, the popularities of the features among the users in each of the respective tenants may be determined and those features that are identified as being unpopular among the users in the respective tenants may be promoted to the users. In yet further examples, the features that are to be promoted to the users in a particular tenant may be determined based upon the popularities of those features among users in tenants that perform similar roles to the users to which the features are to be promoted.

The features may be promoted through use of a visual callout that is to direct the users' attention to the feature of the application. According to an example, the visual callout may be positioned at a location of a page of the application that corresponds to a location of a feature that is determined to be popular among the users in the first tenant.

Through implementation of the apparatuses and methods disclosed herein, features of applications that may be unpopular among a group of users but may be popular among other groups of users may be promoted to the group of users. In one regard, the users may be alerted to features of the applications that the users may otherwise be unaware of for which there may have been considerable effort and costs invested and may be useful to them.

Figure 1:
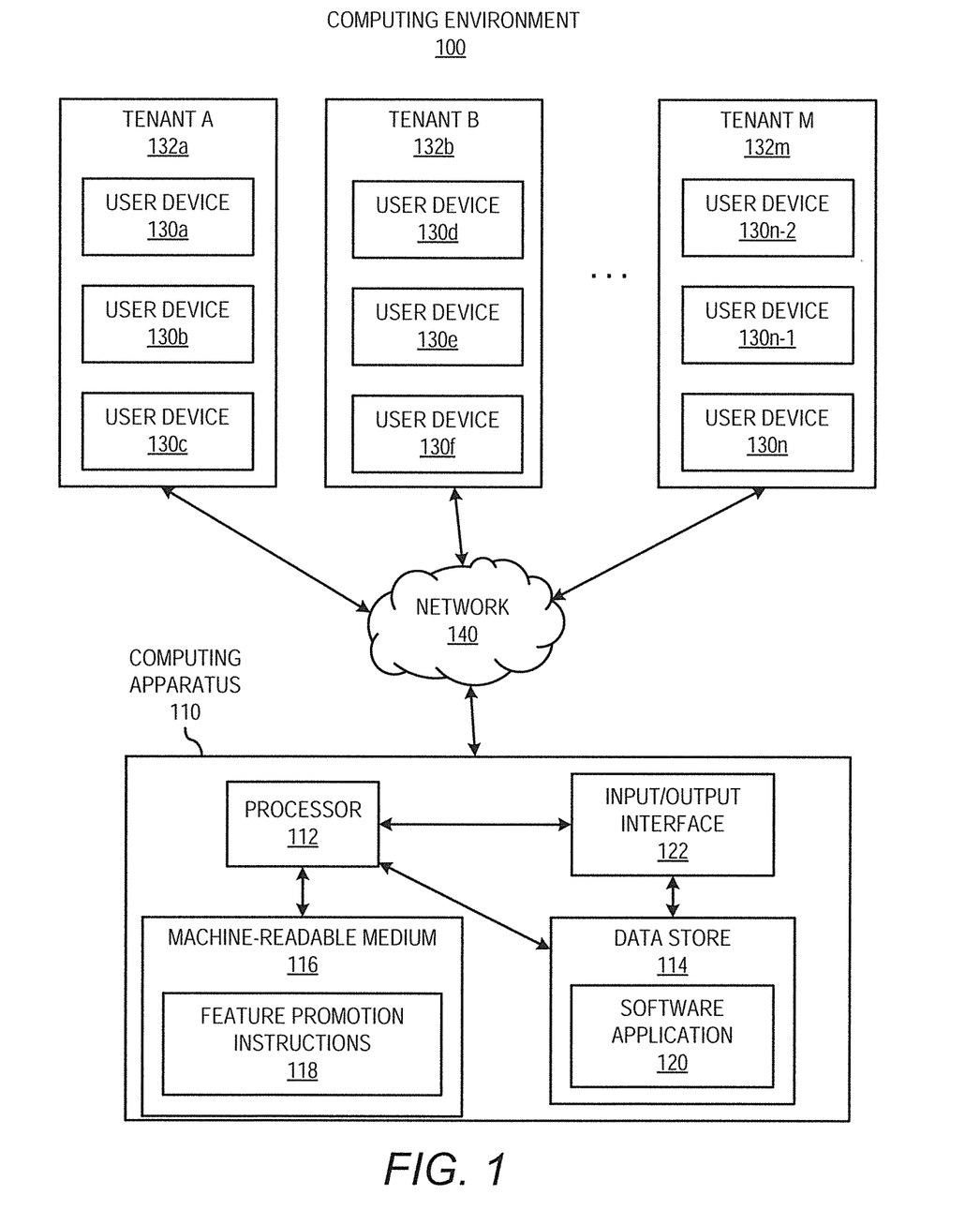
FIG. 1 is a block diagram of an example computing environment within which is contained a computing apparatus that is to execute a method for promoting features of an application.

With reference first to FIG. 1, there is shown a block diagram of an example computing environment 100 within which is contained an example computing apparatus 110 that is to execute a method for promoting features of an application. It should be understood that the computing environment 100 depicted in FIG. 1 may include additional components and that some of the components described herein may be removed and/or modified without departing from a scope of the computing environment 100.

As shown, the computing environment 100 includes a computing apparatus 110, which may be a server computer, a personal computer, or the like. The computing apparatus 110 is depicted as including a processor 112, a data store 114, and a machine-readable medium 116. The processor 112 may be any of a central processing unit (CPU), a semiconductor-based microprocessor, an application specific integrated circuit (ASIC), and/or other hardware device suitable for retrieval and execution of instructions stored in the machine-readable medium 116. The processor 112 may fetch, decode, and execute instructions, such as the feature promotion instructions 118 stored on the machine-readable medium 116. Additionally, the processor 112 may enable access to an application 120 stored in the data store 114 to a plurality of users. The application 120 is discussed in greater detail herein below.

The machine-readable medium 116 may be any electronic, magnetic, optical, or other physical storage device that contains or stores executable instructions. Thus, the machine-readable medium 116 may be, for example, Random Access Memory (RAM), an Electrically Erasable Programmable Read-Only Memory (EEPROM), a storage device, an optical disc, and the like. In some implementations, the machine-readable medium 116 may be a non-transitory machine-readable storage medium, where the term "non-transitory" does not encompass transitory propagating signals.

As described in detail below, the processor 112 may execute the feature promotion instructions 118 to identify which features of the application 120 are to be promoted to a user, a group of users, or groups of users. Particularly, the processor 112 may execute the feature promotion instructions 118 to determine which of the features to promote to a group of users based upon the popularities of the features among other users. By way of particular example, the processor 112 may execute the feature promotion instructions 118 to determine that an unpopular feature among users in a first tenant is popular among users in another tenant and may promote the unpopular feature to the users in the first tenant. In one regard, therefore, the users in the first tenant may be alerted to a feature in the application 120 that the users may not have previously considered using.

The computing apparatus 110 may further include an input/output interface 122 through which a plurality of user devices 130a-130n may communicate with the computing apparatus 110. For instance, the user devices 130a-130n may access the application 120 via the input/output interface 122 for execution on the user devices 130a-130n. The variable "n" may represent an integer value greater than one. Additionally, the communication between the user devices 130a-

130*n* may be made over a network 140, which may be a local area network, a wide area network, the Internet, etc. Moreover, the user devices 130*a*-130*n* may be any suitable computing device that may execute the application 120, such as personal computers, laptop computers, tablet computers, smartphones, etc.

The input/output interface 122 may include hardware and/or machine readable instructions to enable the processor 112 to communicate with the user devices 130*a*-130*n* over the network 140. The input/output interface 122 may enable a wired or wireless connection between the computing apparatus 110 and the network 140. The input/output interface 122 may further include a network interface card and/or may also include hardware and/or machine readable instructions to enable the processor 112 to communicate with various input and/or output devices, such as a keyboard, a mouse, a display, another computing device, etc., through which a user may input instructions into the computing apparatus 110 and may view outputs from the computing apparatus 110.

As also shown in FIG. 1, the user devices 130*a*-130*n* are grouped into one of a plurality of tenants 132*a*-132*m*, in which "m" may represent an integer value greater than one. Generally speaking, each of the tenants 132*a*-132*m* may represent a particular type, class, or group of user. Thus, the users of the user devices 130*a*-130*c* in a first tenant 132*a* may belong to a first type of user and the users of the user devices 130*d*-130*f* in a second tenant 132*b* may belong to a second type of user. By way of particular example, the types of users may include users having different roles in an organization. For instance, a first type of user may have administrative privileges in an organization, a second type of user may be in a marketing department of the organization, a third type of user may be in an engineering department of the organization, and so forth. In one regard, the users in a particular tenant 132*a* may have the same access and privilege rights to the computing apparatus 110 as the other users in the particular tenant 132*a*, but may have different access and privilege rights as compared with users in the other tenants 132*b*-132*m*.

A single instance of the application 120 may run on the computing apparatus 110 and may serve the user devices 130*a*-130*n* in the plurality of tenants 132*a*-132*m*. The user devices 130*a*-130*n* may each be provided with a dedicated share of the application 120, including the data, configuration, user management, etc., of the application 120. In this regard, the application 120 may be multiple tenant application.

As discussed in greater detail below, the processor 112 may execute the feature promotion instructions 118 to identify, for a first tenant 132*a* of the plurality of tenants 132*a*-132*m*, a feature of the application 120 that is unpopular among the users of the user devices 130*a*-130*c* in the first tenant 132*a*. The processor 112 may also execute the feature promotion instructions 118 to determine a popularity of the unpopular feature among users of the user devices 130*d*-130*n* in the other tenants 132*b*-132*m*.

The processor 112 may also determine whether to promote the unpopular feature to a user of a user device 130*a* in the first tenant 132*a* based upon the determined popularity of the unpopular feature among the users in the plurality of tenants 132*a*-132*m*. For instance, the processor 112 may determine that the unpopular feature is to be promoted to a user of a user device 130*a* in the first tenant 132*a* if the popularity of the unpopular feature exceeds a predetermined threshold level among the users in the other tenants 132*b*-132*m*. Alternatively, the processor 112 may determine that the unpopular feature is not to be promoted to a user of the user device 130*a* in the first tenant 132*a* if the popularity of the unpopular feature falls below the predetermined threshold level.

The processor 112 may further cause a visual callout to the unpopular feature to be displayed on the user device 130*a* in response to a determination that the unpopular feature is to be promoted. By way of particular example, the visual callout may be a pop-up notification that is to focus a user's attention onto the unpopular feature. In addition, the visual callout may include a description of the unpopular feature. In other examples, the visual callout may be any suitable element that is to draw a user's attention to a particular feature on a displayed page corresponding to the application 120.

Although the discussion above has been directed to a single user in the first tenant 132*a*, the features discussed above may be applied to some or all of the users in the first tenant 132*a*. Thus, for instance, the processor 112 may cause a visual callout to the unpopular feature to be displayed on all of the user devices 130*a*-130*c* in the first tenant 132*a*. Additionally, the processor 112 may identify respective features to be promoted to the users 130*a*-130*n* in each of the respective tenants 132*a*-132*m* based upon the popularities of the features among the various users.

Figure 2:
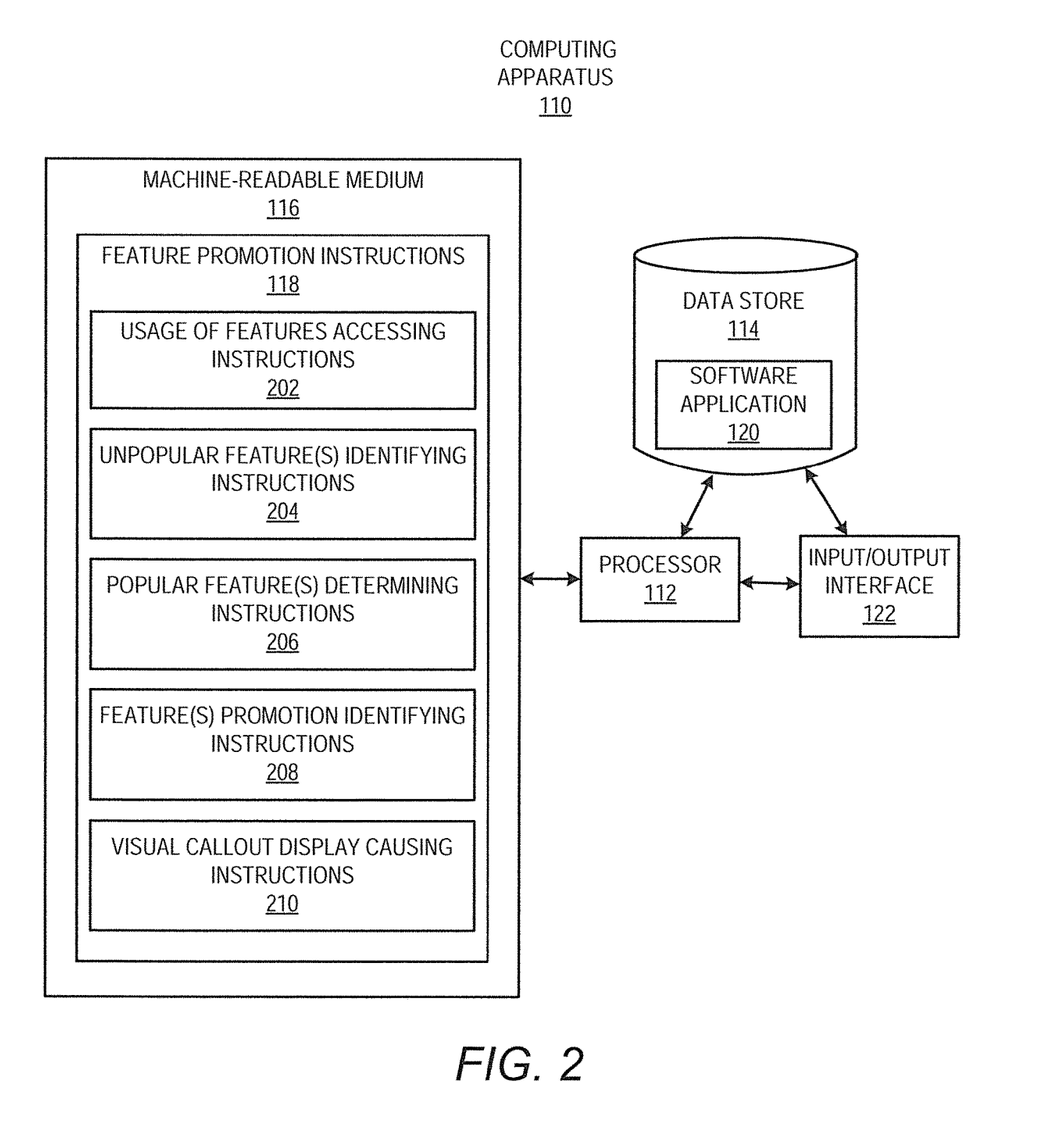
FIG. 2 shows a block diagram of the example computing device depicted in FIG. 1.

Turning now to FIG. 2, there is shown a block diagram of the example computing device 110 depicted in FIG. 1. Particularly, FIG. 2 shows a more detailed depiction of the example computing device 110 depicted in FIG. 1. In this regard, the computing apparatus 110 is depicted in FIG. 2 as including a processor 112, a data store 114, a machine-readable medium 116, feature promotion instructions 118, an application 120, and an input/output interface 122. Additionally, the feature promotion instructions 118 are depicted as including usage of features accessing instructions 202, unpopular feature(s) identifying instructions 204, popular feature(s) identifying instructions 206, unpopular feature(s) promotion determining instructions 208, and visual callout display causing instructions 210. As discussed in greater detail herein below with respect to FIGS. 3 and 4, the processor 112 may execute the instructions 202-210 to identify and promote a feature of the application 120 to a user, a group of users, or groups of users based upon a determined popularity of that feature to the group of users.

Figure 3:
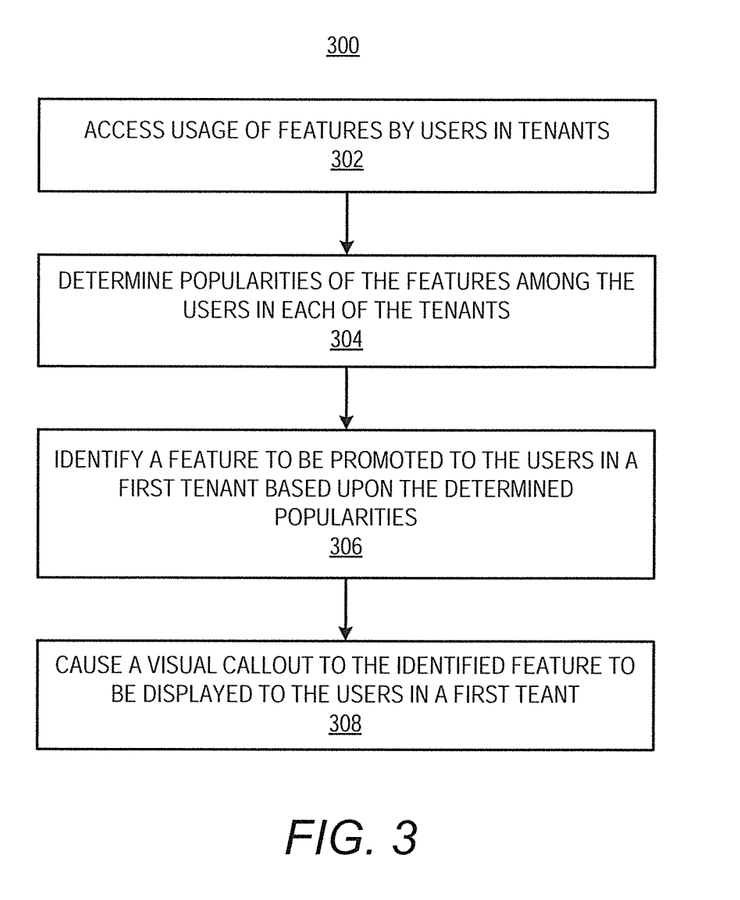
FIGS. 3 and 4, respectively, show flow diagrams of example methods for promoting a feature of an application.
Figure 4:
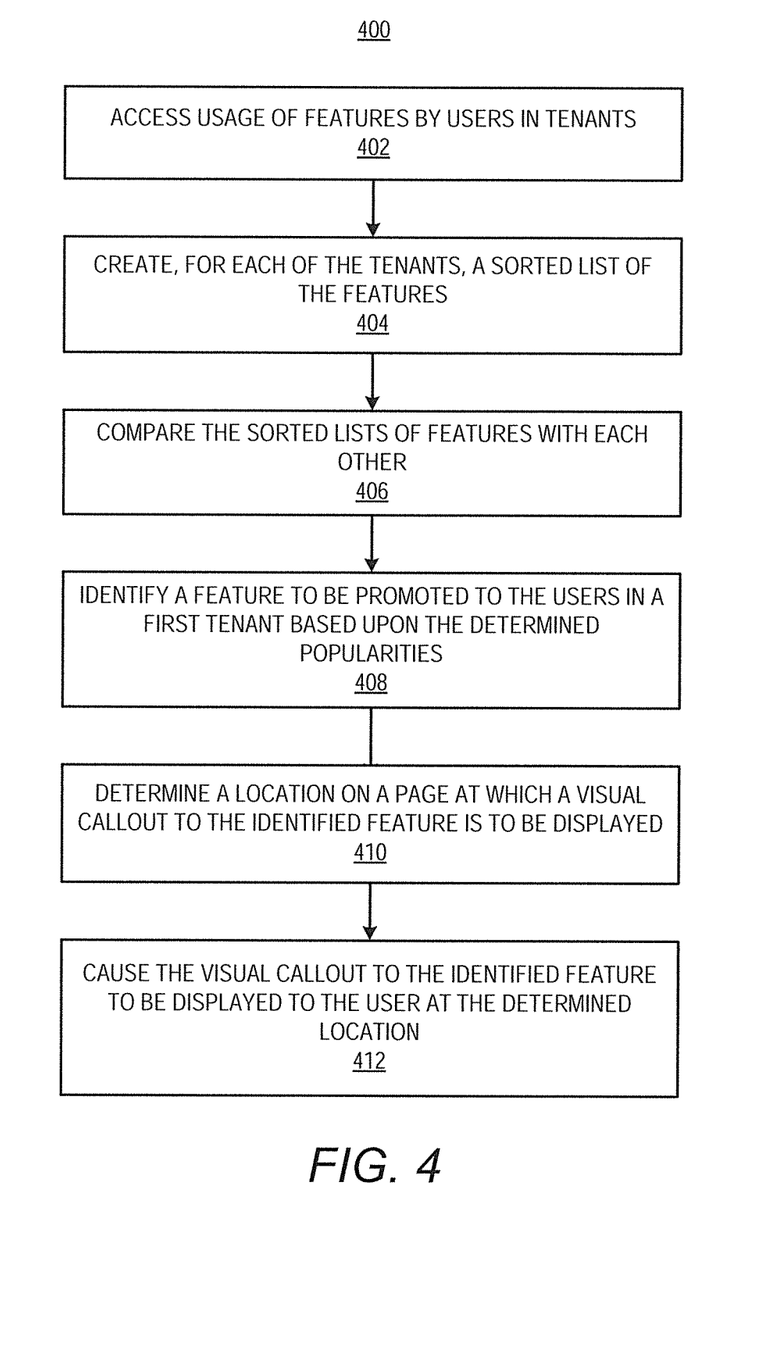

With reference now to FIGS. 3 and 4, there are respectively shown flow diagrams of example methods 300 and 400 for promoting a feature of an application 120 to a user, a group of users, or groups of users. By way of example, the user or the group of users may be part of a particular tenant 132*a*. It should be understood that the methods 300 and 400 depicted in FIGS. 3 and 4 may include additional operations and that some of the operations described therein may be removed and/or modified without departing from the scopes of the methods 300 and 400. The descriptions of the methods 300 and 400 are made with reference to the computing apparatus 110 depicted in FIGS. 1 and 2 for purposes of illustration and thus, it should be understood that the methods 300 and 400 may be implemented in computing apparatuses having architectures different from those shown in the computing apparatus 110 in FIGS. 1 and 2.

Generally speaking, the processor 112 of the computing apparatus 110 may implement or execute the instructions 202-210 stored on the machine-readable medium 116 to perform some or all of the operations of the methods 300 and 400.

With reference first to the method 300, at block 302, the processor 112 may execute the usage of features accessing instructions 202 to access usage of a plurality of features of an application 120 by the users in each of a plurality of tenants 132a-132m. The features of the application 120 may be elements of the application 120 that the users may activate to perform various tasks. In an example in which the application 120 is a project management application, the features may be links, such as text, icons, thumbnails, or the like, to tasks corresponding to the management of projects. In another example in which the application 120 is a word processing application, the features may be links, such as text, icons, thumbnails, or the like, to tasks, such as setting up macros, emailing, or the like, corresponding to the processing of electronic documents.

According to an example, the processor 112 may execute the usage of features accessing instructions to access usage data collected, for instance, by an analytics tool, on the application 120. In another example, the processor 112 may execute an analytics tool to track the usage of the application 120 features by the users in the tenants 132a-132m. In any of these examples, from the accessed usage data, the processor 112 may determine the number of times each of the application 120 features are accessed by the users. Additionally, the processor 112 may determine the number of times the users in each of the respective tenants 132a-132m accessed the application 120 features. Thus, for instance, the processor 112 may determine, for each tenant 132a-132m, the number of times each of the application 120 features have been accessed by the users in the tenant 132a-132m.

At block 304, the processor 112 may execute the popular feature(s) determining instructions 206 to determine popularities of the features among the users in the plurality of tenants 132a-132m. Particularly, the processor 112 may determine the popularities of the features based upon the number of times each of the features has been accessed by the users in the respective tenants 132a-132m. Thus, for instance, the processor 112 may determine for a first tenant 132a, that the users accessed a first feature the most and accessed a second feature the least. In this example, the processor 112 may determine that, for the users in the first tenant 132a, the first feature is more popular than the second feature. However, the processor 112 may determine that, for users in a second tenant 132b, the first feature is less popular than the second feature.

According to an example, the processor 112 may create, for each of the tenants 132a-132m, a sorted list of the features according to the determined usage of the features by the users in the respective tenant 132a-132m. Additionally, the processor 112 may compare the sorted lists of features of the tenants 132a-132m with each other to determine differences between the usage of the features by the users in the tenants 132a-132m. Moreover, the processor 112 may determine, in each of the sorted lists, which of the features have usages that exceed a predetermined threshold and which of the features have usages that fall below the predetermined threshold, in which the features having usages that exceed the predetermined threshold are deemed to be popular and the features having usages that all below the predetermined threshold are deemed to be unpopular.

At block 306, the processor 112 may execute the feature (s) promotion identifying instructions 208 to identify, for a first tenant 132a, a feature of the plurality of features to be promoted to the users in the first tenant 132a based upon the determined popularities of the features. Particularly, for instance, the processor 112 may identify one of the features of the plurality of application 120 features that has been determined as being unpopular among the users in the first tenant 132a and as being popular among the users in the other tenants 132b-132m. The processor 112 may also identify a feature that meets this criteria as the feature to be promoted to the users in the first tenant 132a. By way of particular example, the processor 112 may identify a feature that is the least popular among the users in the first tenant 132a but is popular, e.g., exceeds a predetermined threshold, among the users at least one of the other tenants 132b-132m, and may identify that feature as the feature to be promoted to the users in the first tenant 132a.

As another example, the processor 112 may identify a number of features that are deemed to be unpopular among the users in the first tenant 132a, e.g., falls below the predetermined threshold, and determine whether any of those features are deemed to be popular among the users in one or more of the other tenants 132b-132m. In this example, the processor 112 may identify one of the features that is deemed to be both unpopular among the users in the first tenant 132a and popular among the users in one or more of the other tenants 132b-132m as the feature that is to be promoted to the users in the first tenant 132a.

At block 308, the processor 112 may execute the visual callout display causing instructions 210 to cause a visual callout to the identified feature to be displayed to the users in the first tenant 132a. More particularly, the processor 112 may cause a visual callout to the unpopular feature to be displayed on the user devices 130-130c of the users in the first tenant 132a when the users access the application 120 on their user devices 130a-130c. The visual callout may be any suitable indicator that is to draw the users' attentions to the identified feature. By way of particular example, the visual callout may be a popup notification originating from or otherwise pointing to the identified feature. In this example, the visual callout may include a brief description of the identified feature, for instance, a description of a task that the users may perform using the identified feature. In another example, the visual callout may be an arrow pointing to an icon or hyperlink to the identified feature, a blinking of the icon or hyperlink, or the like.

Although particular reference is made to the feature being identified for the users in the first tenant 132a, it should be understood that the method 300 may additionally or alternatively be applied to the users in the other tenants 132b-132m. In one example, therefore, unpopular features for each of the tenants 132a-132m may be identified and those features may be promoted to the users in the respective tenants 132a-132m if those features are determined to be sufficiently popular among the users in the other tenants 132a-132m.

Turning now to the method 400 depicted in FIG. 4, at block 402, the processor 112 may execute the usage of features accessing instructions 202 to access usage of a plurality of features of an application 120 by the users in each of a plurality of tenants 132a-132m. Block 402 may be similar to block 302 discussed above with respect to FIG. 3 above and thus a detailed description of block 402 is omitted here.

At block 404, the processor 112 may execute the popular feature(s) determining instructions 206 to create, for each of the plurality of tenants, a sorted list of the features, in which the features are listed according to the determined usage of the features by the users in the respective tenant 132a-132m. That is, the processor 112 may create a first list of features for the users in the first tenant 132a that is sorted in ascending order according to the usage of the features by the users in the first tenant 132a, a second list of features for the users in the second tenant 132b according to the usage of the features by the users in the second tenant 132b, and so forth. Additionally, the processor 112 may store the created lists in the data store 114.

At block 406, the processor 112 may execute the popular feature(s) determining instructions 206 to compare the sorted lists of features of the tenants 132a-132m with each other to determine differences between the usage of the features by the users in the plurality of tenants 132a-132m. That is, the processor 112 may determine which of the features that are used less often by the users in one of the tenants 132a is used more often in other ones of the tenants 132b-132m based upon the comparison.

At block 408, the processor 112 may execute the feature(s) promotion identifying instructions 208 to identify a feature of the plurality of features to be promoted to the users in the first tenant 132a based upon the comparison of the sorted list of features. That is, for instance, the processor 112 may select a feature that falls below a predetermined threshold in the sorted list of features for the first tenant 132a and that exceeds the predetermined threshold in the sorted list of features of at least one of the other tenants 132b-132m as the identified feature to be promoted to the users in the first tenant 132a.

At block 410, the processor 112 may execute the visual callout display causing instructions 210 to determine a location on a page of the application 120 at which a visual callout to the identified feature is to be displayed to the users in the first tenant 132a. According to an example, the processor 112 may determine the location to be situated near an icon representing the identified feature on the page of the application 120. In another example, the processor 112 may identify a popular feature for the users in the first tenant 132a and may determine the location of the visual callout to be situated near an icon corresponding to the popular feature displayed on the page.

At block 412, the processor 112 may execute the visual callout display causing instructions 210 to cause a visual callout to the identified feature to be displayed to the users in the first tenant 132a at the determined location on the page of the application 120. As discussed above, the visual callout may be any suitable indicator that is to draw the users' attentions to the identified feature.

Although particular reference is made to the feature being identified for the users in the first tenant 132a, it should be understood that the method 400 may additionally or alternatively be applied to the users in the other tenants 132b-132m. In one example, therefore, unpopular features for each of the tenants 132a-132m may be identified and those features may be promoted to the users in the respective tenants 132a-132m if those features are determined to be sufficiently popular among the users in the other tenants 132a-132m.

Some or all of the operations set forth in the methods 300 and 400 may be contained as utilities, programs, or subprograms, in any desired computer accessible medium. In addition, the methods 300 and 400 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method comprising:
   accessing, by a processor, usage of a plurality of features of an application by users in each tenant of a plurality of tenants, wherein the plurality of tenants are different groups of users, and the users in each tenant belong to a same type of users;
   determining, by the processor, popularities and unpopularities of each feature of the plurality of features among the users in each tenant of the plurality of tenants, including:
      comparing a total usage of each feature of the plurality of features by all of the users in each tenant to a predetermined threshold,
      in response to a determination that the total usage of the feature by all of the users in the tenant is above the predetermined threshold, determining that the feature is popular among the users in the tenant, and
      in response to a determination that the total usage of the feature is below the predetermined threshold, determining that the feature is unpopular among the users in the tenant;
   based on the popularities and unpopularities of each feature of the plurality of features among the users in each tenant of the plurality of tenants, identifying, by the processor, for a first tenant of the plurality of tenants, a first feature of the plurality of features as being unpopular among the users in the first tenant and as being popular among the users in other tenants of the plurality of tenants; and
   causing, by the processor, a display of the first feature to all of the users in the first tenant to promote the first feature to the users in the first tenant.

2. The method according to claim 1, further comprising:
   creating, for each tenant of the plurality of tenants, a sorted list of features of the plurality of features according to the popularities and unpopularities of the plurality of features among all of the users in each tenant; and
   comparing, by the processor, the sorted lists with each other to determine differences between the usage of the plurality of features by the users in the plurality of tenants,
   wherein identifying the first feature further comprises identifying the first feature based upon the comparison of the sorted lists.

3. The method according to claim 2, further comprising:
   determining, in each list of the sorted lists, which features of the plurality of features correspond to first usages of the plurality of features that each exceeds the predetermined threshold and which features of the plurality of features correspond to second usages of the plurality of features that each falls below the predetermined threshold, wherein the features corresponding to the first usages are determined to be popular and the features corresponding to the second usages are determined to be unpopular, and
   wherein identifying the first feature further comprises identifying the first feature to be a feature that is determined to be unpopular to the users in the sorted list for the first tenant.

4. The method according to claim 3, wherein identifying the first feature further comprises identifying the first feature to be a feature that is determined to be popular to the users in the sorted list for the tenant or tenants of the plurality of tenants other than the first tenant.

5. The method according to claim 4, wherein the users in the first tenant perform a first role in an organization, and
   wherein identifying the first feature further comprises identifying the first feature to be a feature that is determined to be popular to the users in another tenant of the plurality of tenants which perform a similar role to the first role.

6. The method according to claim 1, wherein the application includes a page that is displayed to the users in the first tenant, the method further comprising:
   determining a location on the page at which a visual callout to the first feature is to be displayed; and
   wherein causing a display of the first feature comprises causing the visual callout to the first feature to be displayed at the location on the page.

7. The method according to claim 6, further comprising:
   identifying a popular feature of the plurality of features for the users in the first tenant, wherein the popular feature is a feature that exceeds a predefined threshold value of popularity of the users in the first tenant;
   identifying a position at which an icon corresponding to the popular feature is to be displayed on the page; and
   wherein determining the location on the page further comprises determining the location on the page to be based on the position of the icon.

8. The method according to claim 1, further comprising:
   for each tenant of the plurality of tenants,
      determining whether a given feature of the plurality of features is to be promoted to the users in the tenant based on a popularity of the given feature; and
      in response to a determination that the given feature is to be promoted, causing a display of the given feature to the users in the tenant.

9. A computing apparatus comprising:
   a processor; and
   a machine-readable medium storing machine-readable instructions that, when executed by the processor, cause the processor to:
      access usage of a plurality of features of an application by users in each group of a plurality of groups, wherein the users in each group belong to a same type of users;
      determine popularities and unpopularities of each feature of the plurality of features among the users in each group of the plurality of groups, including machine-readable instructions that cause the processor to:
         compare a total usage of each feature of the plurality of features by all of the users in each group to a predetermined threshold,
         in response to a determination that the total usage of the feature by all of the users in the group is above the predetermined threshold, determine that the feature is popular among the users in the group, and
         in response to a determination that the total usage of the feature is below the predetermined threshold, determine that the feature is unpopular among the users in the group;
      based on the popularities and unpopularities of each feature of the plurality of features among the users in each group of the plurality of groups, identify, for a first group of the plurality of groups, a first feature of the plurality of features as being unpopular among the users in the first group and as being popular among the users in other groups of the plurality of groups; and
      cause a display of the first feature to all of the users in the first group to promote the first feature to the users in the first group.

10. The computing apparatus according to claim 9, wherein the machine-readable instructions, when executed by the processor, further cause the processor to:
   create, for each group of the plurality of groups, a sorted list of the plurality of features according to the popularities and unpopularities of the plurality of features among the users in each group;
   compare the sorted lists with each other to determine differences between the usage of the plurality of features by the users in the plurality of groups; and
   wherein the machine-readable instructions cause the processor to identify the first feature based upon the comparison of the sorted lists.

11. The computing apparatus according to claim 10, wherein the machine-readable instructions, when executed by the processor, further cause the processor to determine, in each list of the sorted lists, which features of the plurality of features correspond to first usages of the plurality of features that each exceeds the predetermined threshold and which features of the plurality of features correspond to second usages of the plurality of features that each falls below the predetermined threshold,
   wherein the features corresponding to the first usages are determined to be popular and the features corresponding to the second usages are determined to be unpopular, and
   wherein the machine-readable instructions further cause the processor to identify the first feature to be a feature that is unpopular to the users in the sorted list for the first group.

12. The computing apparatus according to claim 9, wherein the application includes a page that is displayed to the users in the first group, and wherein the machine-readable instructions, when executed by the processor, further cause the processor to:
   determine a location on the page at which a visual callout to the first feature is to be displayed; and
   cause the visual callout to be displayed at the location.

13. The computing apparatus according to claim 9, wherein the machine-readable instructions, when executed by the processor, further cause the processor to:
   identify, for the users in the first group, a popular feature of the plurality of features, wherein the popular feature is a feature of the plurality of features which exceeds a predefined threshold value of popularity of the users in the first group;

identify a position at which an icon corresponding to the popular feature is to be displayed; and determine a location on a page at which a visual callout to the first feature is to be displayed to be based on the position of the icon corresponding to the popular feature.

14. A non-transitory machine-readable storage medium that stores machine-readable instructions that, when executed by a processor, cause the processor to:

access usage of a plurality of features of an application by users in each group of a plurality of groups, wherein the users in each group belong to a same type of users;

determine popularities and unpopularities of each feature of the plurality of features among the users in each group of the plurality of groups, including instructions that cause the processor to:

compare a total usage of each feature of the plurality of features by all of the users in each group to a predetermined threshold, in response to a determination that the total usage of the feature by all of the users in the group is above the predetermined threshold, determine that the feature is popular among the users in the group, and in response to a determination that the total usage of the feature is below the predetermined threshold, determine that the feature is unpopular among the users in the group;

create, for each group of the plurality of groups, a sorted list of the plurality of features according to the popularities and unpopularities of each feature of the plurality of features among the users in each group;

compare the sorted lists with each other to determine differences between the usage of the plurality of features by the users in the plurality of groups;

based on the comparison of the sorted lists, identify, for a first group of the plurality of groups, a first feature of the plurality of features as being unpopular among the users in the first group and as being popular among the users in other groups of the plurality of groups; and cause a display of the first feature to all of the users in the first group to promote the first feature to the users in the first group.

15. The non-transitory machine-readable storage medium according to claim 14, wherein the application includes a page that is displayed to the users in the first group, and wherein the machine-readable instructions, when executed by the processor, further cause the processor to:

identify a popular feature of the plurality of features for the users in the first group, wherein the popular feature exceeds a predefined threshold value of popularity of the users in the first group;

identify a position at which an icon corresponding to the popular feature is displayed on the page; and cause a visual callout to the first feature to be displayed at a location based on the position of the icon corresponding to the popular feature.

16. The non-transitory machine-readable storage medium according to claim 14, wherein the users in the first group perform a first role in an organization, and wherein the machine-readable instructions, when executed, cause the processor to identify a feature that is determined to be popular to the users in another group of the plurality of groups which perform a similar role to the first role.

17. The non-transitory machine-readable storage medium according to claim 14, wherein the application includes a page that is displayed to the users in the first group, and wherein the machine-readable instructions cause the processor to:

determine a location on the page at which a visual callout to the first feature is to be displayed; and wherein the machine-readable instructions, when executed, cause the processor to cause the visual callout to be displayed at the location on the page.

* * * * *